US012666119B2

(12) United States Patent
Soryal et al.

(10) Patent No.: US 12,666,119 B2
(45) Date of Patent: Jun. 23, 2026

(54) METHOD AND SYSTEM FOR MULTI-MODAL EVENT RECREATION

(71) Applicants: AT&T Intellectual Property I, L.P., Atlanta, GA (US); AT&T Technical Services Company, Inc., Vienna, VA (US)

(72) Inventors: Joseph Soryal, Glendale, NY (US); Michael Gonzales, Austin, TX (US); Yupeng Jia, South Pasadena, CA (US); Adrianne Binh Luu, Atlanta, GA (US); Robert Moton, Jr., Alpharetta, GA (US); Daniel Vivanco, Ashburn, VA (US); Ari Craine, Marietta, GA (US); Robert Koch, Norcross, GA (US)

(73) Assignees: AT&T Intellectual Property I, L.P., Atlanta, GA (US); AT&T Technical Services Company, Inc., Vienna, VA (US)

( * ) Notice: Subject to any disclaimer, the term of this patent is extended or adjusted under 35 U.S.C. 154(b) by 0 days.

(21) Appl. No.: 18/966,792

(22) Filed: Dec. 3, 2024

(65) Prior Publication Data

US 2026/0156332 A1     Jun. 4, 2026

(51) Int. Cl.
| | |
|---|---|
| *H04N 21/854* | (2011.01) |
| *G06F 16/48* | (2019.01) |
| *G06F 16/487* | (2019.01) |

(52) U.S. Cl.
CPC ......... *H04N 21/854* (2013.01); *G06F 16/487* (2019.01); *G06F 16/489* (2019.01)

(58) Field of Classification Search
CPC .... H04N 21/854; G06F 16/487; G06F 16/489
See application file for complete search history.

(56) References Cited

U.S. PATENT DOCUMENTS

| | | | | |
|---|---|---|---|---|
| 11,284,041 B1 * | 3/2022 | Bergamo | ................ | G06T 7/251 |
| 2011/0314144 A1 * | 12/2011 | Goodman | ............. | H04W 4/021 709/224 |
| 2017/0188807 A1 * | 7/2017 | Swital | .................... | G16H 40/63 |

* cited by examiner

*Primary Examiner* — Thai Q Tran
*Assistant Examiner* — Jose M Mesa
(74) *Attorney, Agent, or Firm* — Guntin & Gust, PLC; Louis Yang

(57) ABSTRACT

Aspects of the subject disclosure may include, for example, receiving a request to create an electronic representation of a past event (that occurred at a first location during a first time period); identifying stored data that had been captured by sensors (the stored data comprising first data that had been captured at a second location during a second time period and second data that had been captured at a third location during a third time period); obtaining the plurality of stored data that had been identified; and generating the electronic representation of the past event (the electronic representation of the past event comprising at least a first element from the first data and at least a second element from the second data). Other embodiments are disclosed.

20 Claims, 12 Drawing Sheets

2002

Receiving, by a processing system including a processor, a request to create an electronic representation of a past event, wherein the past event occurred at a first location during a first time period

2004

Identifying, by the processing system, a plurality of stored data that had been captured by a plurality of sensors, wherein the plurality of stored data comprises first data that had been captured at a second location during a second time period and second data that had been captured at a third location during a third time period, wherein each of the second and third locations is within a threshold distance relative to the first location, and wherein each of the second time period and the third time period is within a threshold time relative to the first time period

2006

Obtaining, by the processing system, the plurality of stored data that had been identified

2008

Generating, by the processing system, the electronic representation of the past event, wherein the electronic representation of the past event comprises at least a first element from the first data and at least a second element from the second data

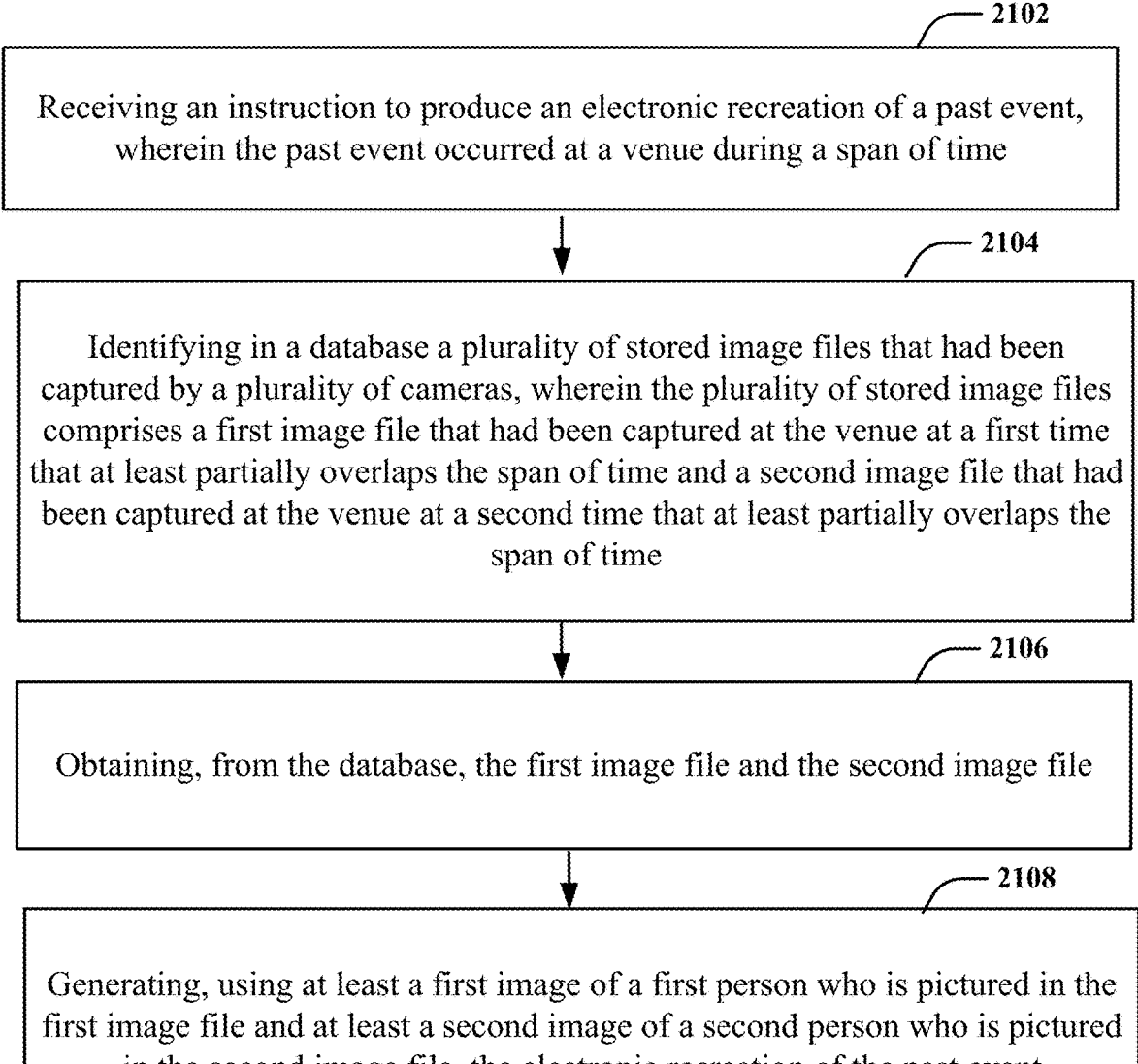

2102

Receiving an instruction to produce an electronic recreation of a past event, wherein the past event occurred at a venue during a span of time

2104

Identifying in a database a plurality of stored image files that had been captured by a plurality of cameras, wherein the plurality of stored image files comprises a first image file that had been captured at the venue at a first time that at least partially overlaps the span of time and a second image file that had been captured at the venue at a second time that at least partially overlaps the span of time

2106

Obtaining, from the database, the first image file and the second image file

2108

Generating, using at least a first image of a first person who is pictured in the first image file and at least a second image of a second person who is pictured in the second image file, the electronic recreation of the past event

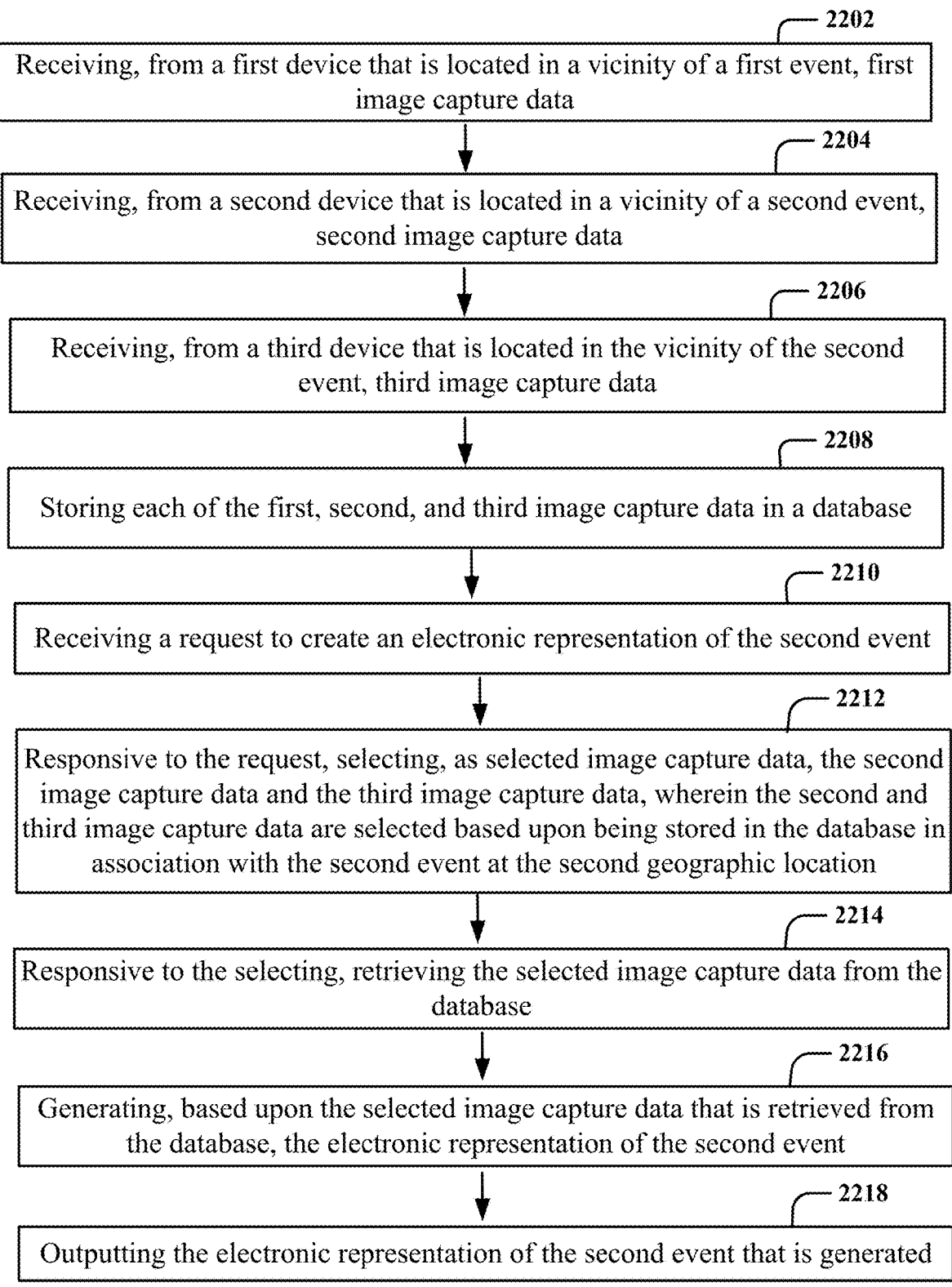

2202

Receiving, from a first device that is located in a vicinity of a first event, first image capture data

2204

Receiving, from a second device that is located in a vicinity of a second event, second image capture data

2206

Receiving, from a third device that is located in the vicinity of the second event, third image capture data

2208

Storing each of the first, second, and third image capture data in a database

2210

Receiving a request to create an electronic representation of the second event

2212

Responsive to the request, selecting, as selected image capture data, the second image capture data and the third image capture data, wherein the second and third image capture data are selected based upon being stored in the database in association with the second event at the second geographic location

2214

Responsive to the selecting, retrieving the selected image capture data from the database

2216

Generating, based upon the selected image capture data that is retrieved from the database, the electronic representation of the second event

2218

Outputting the electronic representation of the second event that is generated

METHOD AND SYSTEM FOR MULTI-MODAL EVENT RECREATION

CROSS REFERENCE TO RELATED APPLICATION(S)

This application is related to U.S. application Ser. No. 18/921,806, filed Oct. 21, 2024. All sections of the aforementioned application(s) and/or patent(s) are incorporated herein by reference in their entirety.

FIELD OF THE DISCLOSURE

The subject disclosure relates to a method and system for multi-modal event recreation.

BACKGROUND

Various current systems often lack the capability to present to a user a digital recreation of a past event when no such complete digital representation of the event exists.

BRIEF DESCRIPTION OF THE DRAWINGS

Reference will now be made to the accompanying drawings, which are not necessarily drawn to scale, and wherein:

FIG. 2E depicts an illustrative embodiment of a method in accordance with various aspects described herein.

FIG. 2F depicts an illustrative embodiment of a method in accordance with various aspects described herein.

FIG. 2G depicts an illustrative embodiment of a method in accordance with various aspects described herein.

DETAILED DESCRIPTION

Figure 1:
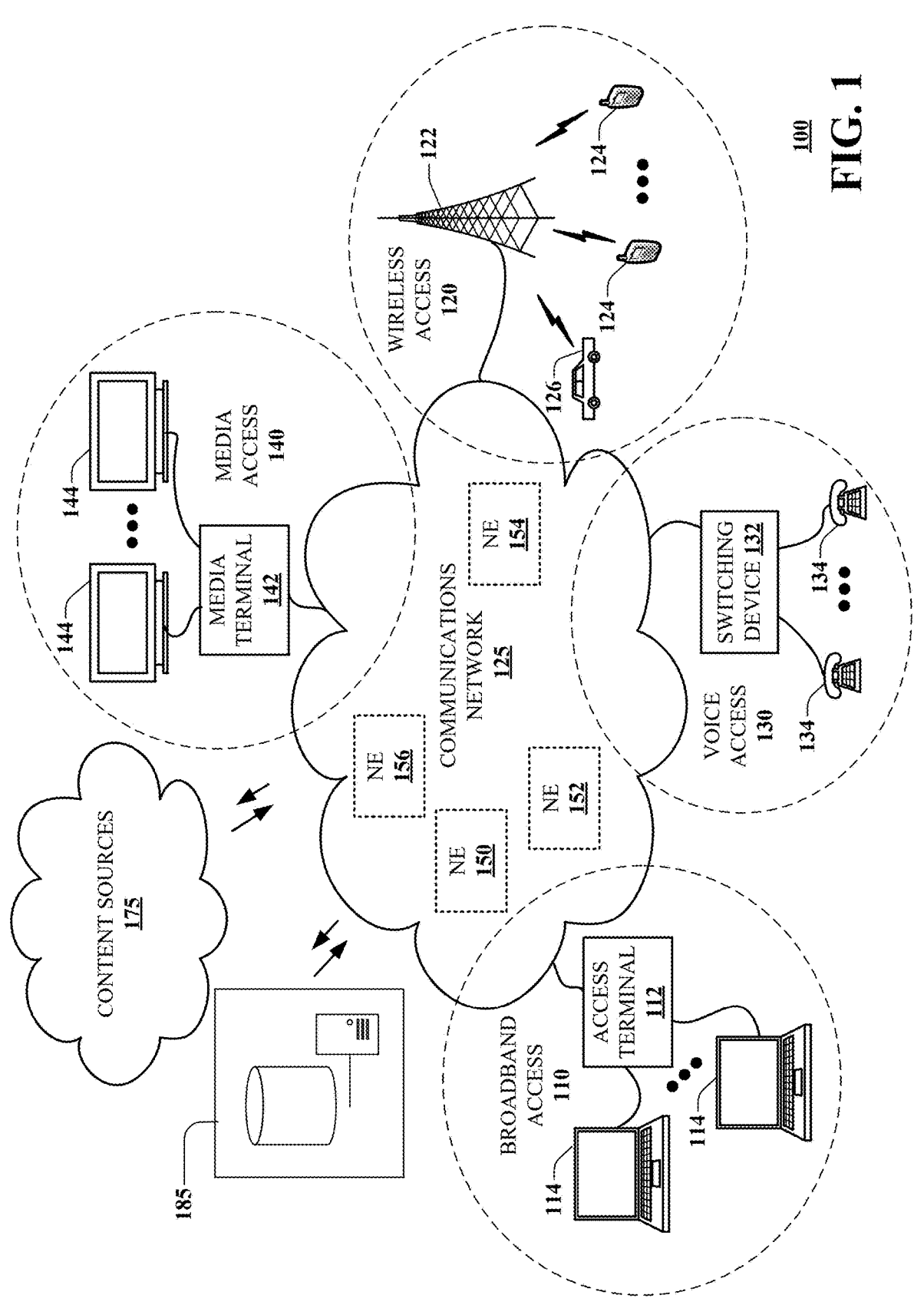
FIG. 1 is a block diagram illustrating an example, non-limiting embodiment of a communication network in accordance with various aspects described herein.

The subject disclosure describes, among other things, illustrative embodiments for producing a digital recreation of an event that occurred in the past. The digital recreation can include media such as images, audio, and/or video. The digital recreation can additionally include supplementary data (such as textual descriptions). In various embodiments, the digital recreation can be requested by one or more users who were at the event and/or by one or mor other people (e.g., by someone who was not at the event). In various embodiments, the digital recreation can be created based on a compilation of source data from multiple sources. In various embodiments, the resulting recreation can include AI-generated components (e.g., such that portions of the recreation are based on source data and gaps where no source data exist can be generated by AI). Other embodiments are described in the subject disclosure.

One or more aspects of the subject disclosure include a method comprising: receiving, by a processing system including a processor, a request to create an electronic representation of a past event, wherein the past event occurred at a first location during a first time period; identifying, by the processing system, a plurality of stored data that had been captured by a plurality of sensors, wherein the plurality of stored data comprises first data that had been captured at a second location during a second time period and second data that had been captured at a third location during a third time period, wherein each of the second and third locations is within a threshold distance relative to the first location, and wherein each of the second time period and the third time period is within a threshold time relative to the first time period; obtaining, by the processing system, the plurality of stored data that had been identified; and generating, by the processing system, the electronic representation of the past event, wherein the electronic representation of the past event comprises at least a first element from the first data and at least a second element from the second data.

One or more aspects of the subject disclosure include a device, comprising: a processing system including a processor; and a memory that stores executable instructions that, when executed by the processing system, facilitate performance of operations, the operations comprising: receiving an instruction to produce an electronic recreation of a past event, wherein the past event occurred at a venue during a span of time; identifying in a database a plurality of stored image files that had been captured by a plurality of cameras, wherein the plurality of stored image files comprises a first image file that had been captured at the venue at a first time that at least partially overlaps the span of time and a second image file that had been captured at the venue at a second time that at least partially overlaps the span of time; obtaining, from the database, the first image file and the second image file; and generating, using at least a first image of a first person who is pictured in the first image file and at least a second image of a second person who is pictured in the second image file, the electronic recreation of the past event.

One or more aspects of the subject disclosure include a non-transitory machine-readable medium, comprising executable instructions that, when executed by a processing system including a processor, facilitate performance of operations, the operations comprising: receiving, from a first device that is located in a vicinity of a first event, first image capture data, wherein the first event occurred at a first geographic location; receiving, from a second device that is located in a vicinity of a second event, second image capture data, wherein the second event occurred at a second geographic location; receiving, from a third device that is located in the vicinity of the second event, third image capture data; storing each of the first, second, and third image capture data in a database, wherein the first image capture data is stored in the database in association with the first event at the first geographic location, wherein the second image capture data is stored in the database in association with the second event at the second geographic location, and wherein the third image capture data is stored in the database in association with the second event at the second geographic location; receiving a request to create an electronic representation of the second event; responsive to the request, selecting, as selected image capture data, the second image capture data and the third image capture data, wherein the second and third image capture data are selected based upon being stored in the database in association with the second event at the second geographic location; responsive to the selecting, retrieving the selected image capture data from the database; generating, based upon the selected image capture data that is retrieved from the database, the electronic representation of the second event, wherein the electronic representation of the second event comprises at least a first portion from the second image capture data and at least a second portion from the third image capture data; and outputting the electronic representation of the second event that is generated.

Referring now to FIG. 1, a block diagram is shown illustrating an example, non-limiting embodiment of a system 100 in accordance with various aspects described herein. System 100 can include an event recreation platform 185 to facilitate producing a digital recreation of an event that occurred in the past. The digital recreation can include media such as images, audio, and/or video. Platform 185 can include various components and functionality to implement the event recreation, including in a centralized fashion through one or more servers (e.g., located in the network core or elsewhere), in a distributed fashion (e.g., operating in one or more edge servers), in a virtualized fashion (e.g., operating via virtual machines or virtual functions such as in the Cloud), and/or in a combination of these fashions.

For example, platform 185 can facilitate in whole or in part receiving a request to create an electronic representation of a past event (wherein the past event occurred at a first location during a first time period); identifying a plurality of stored data that had been captured by a plurality of sensors (wherein the plurality of stored data comprises first data that had been captured at a second location during a second time period and second data that had been captured at a third location during a third time period, wherein each of the second and third locations is within a threshold distance relative to the first location, and wherein each of the second time period and the third time period is within a threshold time relative to the first time period); obtaining the plurality of stored data that had been identified; and generating the electronic representation of the past event (wherein the electronic representation of the past event comprises at least a first element from the first data and at least a second element from the second data).

In one or more of the examples described herein, users are frequently described as first, second, third, etc., which should be understood as distinguishing between users in the particular example but is not intended to be limiting in any other way unless expressly described as such.

In one or more embodiments, platform 185 can store user data collected from sensors. In one or more embodiments, the user data can include one or more image files, one or more video files, and/or one or more audio files. In one or more embodiments, each sensor can be part of a respective user device. In one or more embodiments, a sensor can be part of a device that is distinct from any user device.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VOIP gateway or other gateway device and/or other switching device. The telephony devices 134 can include traditional telephones (with or without a terminal adapter), VOIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
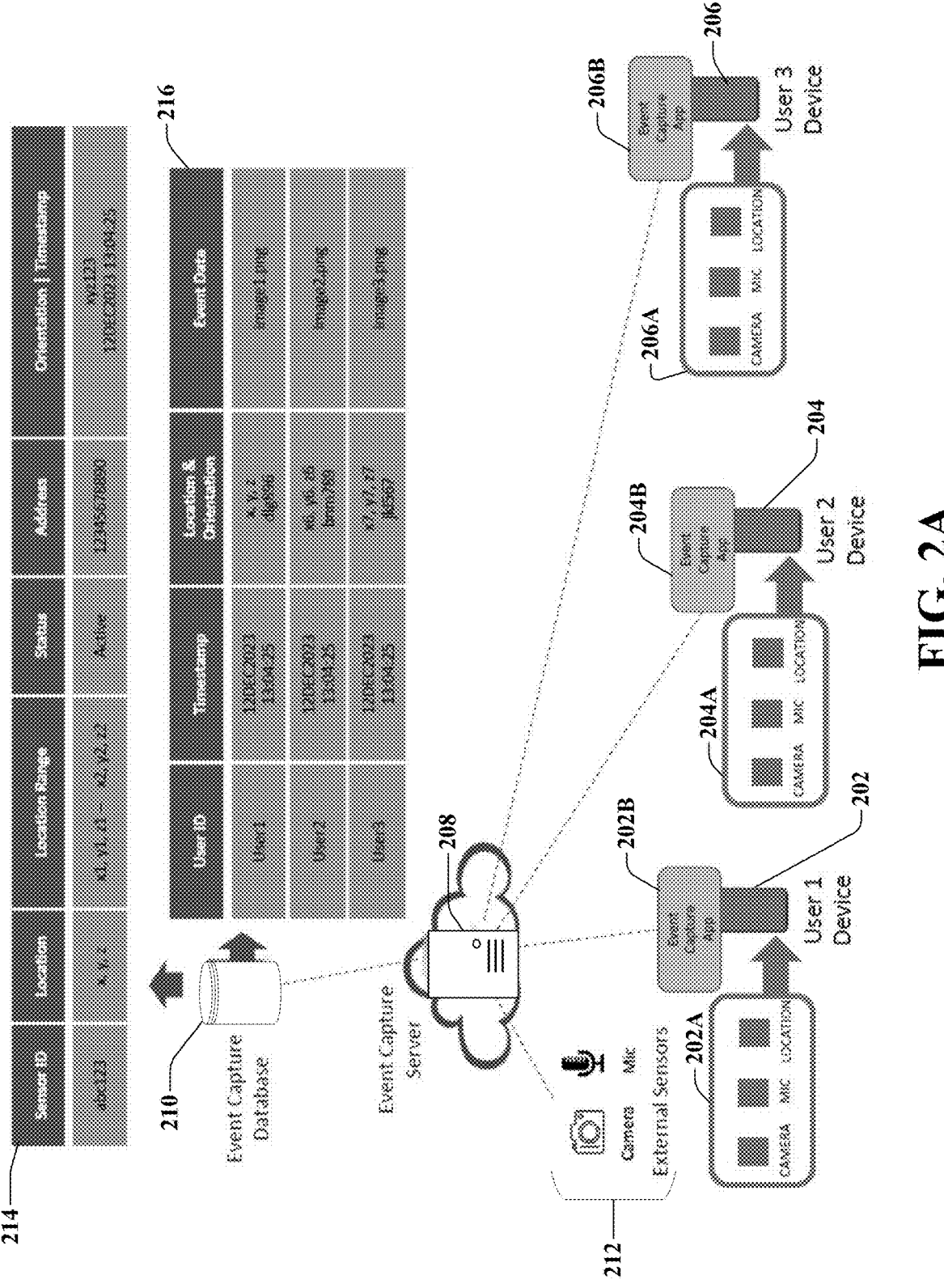
FIG. 2A is a block diagram illustrating an example, non-limiting embodiment of a system (which can function within the communication network of FIG. 1) in accordance with various aspects described herein.

Referring now to FIG. 2A, this is a block diagram illustrating an example, non-limiting embodiment of a system (which can function within the communication network of FIG. 1) in accordance with various aspects described herein. As seen in this figure, User 1 can be equipped with user device 202 (such as a wireless device) that is configured for bi-directional communication with event capture server 208 via a network (e.g., a wireless network). The user device 202 can be equipped with onboard sensors 202A (such as a camera, a microphone, a location sensor, an orientation sensor, etc.). In various examples, user device 202 can comprise a cell phone, a smartphone, a tablet computer, or any combination thereof. In various examples, the network (via which user device 202 communicates with the event capture server 208) can comprise a cellular network, a fourth generation (4G) network, a fifth generation (5G) network, a subsequent generation network, a WiFi network, or any combination thereof. In various examples, the event capture server 208 can operate on a cloud computing platform. In addition, user device 202 can be equipped with an event capture app 202B that is configured for bi-directional communication with the event capture server 208 via the network. Further, the event capture server 208 can have bi-directional communication access to event capture database 210.

Still referring to FIG. 2A, it is seen that User 2 can be equipped with user device 204 (such as a wireless device) that is configured for bi-directional communication with event capture server 208 via the network. User device 204 can be equipped with onboard sensors 204A (such as a camera, a microphone, a location sensor, an orientation sensor, etc.). Further, User 3 can be equipped with user device 206 (such as a wireless device) that is configured for bi-directional communication with event capture server 208 via the network. User device 206 can be equipped with onboard sensors 206A (such as a camera, a microphone, a location sensor, an orientation sensor, etc.). In various examples, each of user device 204 and user device 206 can comprise a cell phone, a smartphone, a tablet computer, or any combination thereof. In addition, user device 204 can be equipped with an event capture app 204B that is configured for bi-directional communication with the event capture server 208 via the network and user device 206 can be equipped with an event capture app 206B that is configured for bi-directional communication with the event capture server 208 via the network. Of course, while three users/user devices are described, any desired number of users/user devices can be supported.

Still referring to FIG. 2A, it is seen that external sensors 212 can be configured for bi-directional communication with event capture server 208 via the network. The external sensors 212 can comprise one or more cameras (still and/or video), one or more microphones, and/or the like. The external sensors can be located proximate to one or more of the users/user devices. Each external sensor 212 can be registered in the event capture database 210. An example storage format 214 includes a unique sensor ID, a location of the sensor (e.g., in 3D space), a range of operation location coordinates for the sensor (e.g., in 3D space), status of the sensor, a communication address (e.g., network address) for the sensor, an operational orientation, and a timestamp. The operational orientation can (such as in the case of a camera) include an indication of in which direction the camera is pointed, and/or a field of view of the camera. The timestamp can indicate the point in time of the orientation (this can be pertinent in the case of a sensor (such as a camera) that has a changeable orientation and/or location).

Still referring to FIG. 2A, it is seen that the user devices 202, 204, 206 can register (e.g., via user registration) with the event capture database 210. Each registration can comprise a respective user ID. An example storage format 216 includes (for each respective user ID) a timestamp, a location and an orientation of the user device, an event data (e.g., an image file; a video file, and/or an audio file). Each event data can have been captured by one or more sensors of a respective user device. For each user device, a respective location and orientation can be continually updated over time, as subsequent event data (such as images/video/audio) are recorded. The event capture database 210 can further include for each event data record corresponding descriptive information. In the example shown in FIG. 2A, at this point in time, three images have been captured. The three images are not necessarily associated with one another (although they could be). In one embodiment, the event data is stored in such a manner that the event data could be later retrieved and associated as necessary in order to be able to generate a requested digital recreation of an event.

Figure 2B:
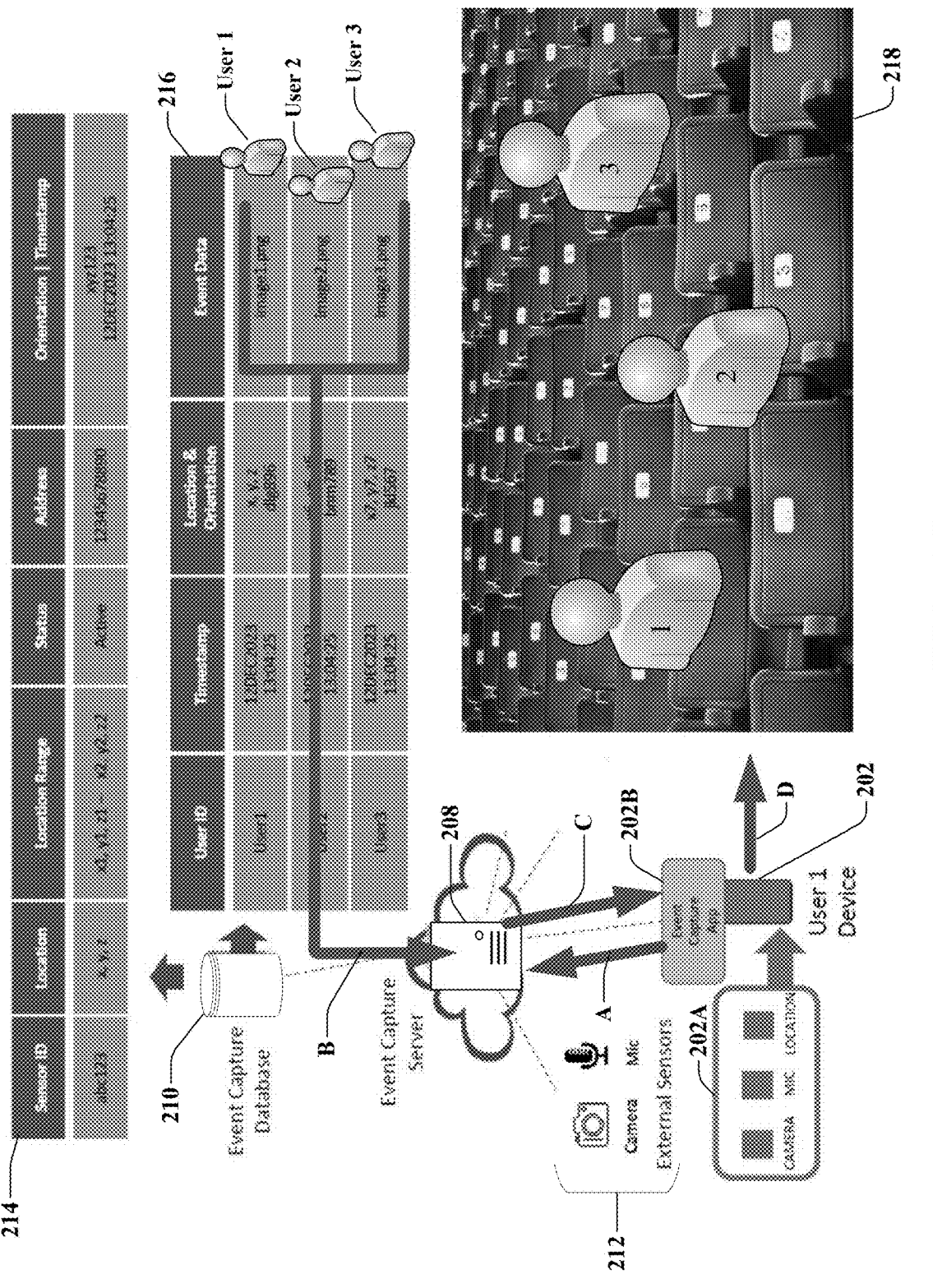
FIG. 2B is a block diagram illustrating an example, non-limiting embodiment of a system (which can function within the communication network of FIG. 1) in accordance with various aspects described herein.

Referring now to FIG. 2B, this is a block diagram illustrating an example, non-limiting embodiment of a system (which can function within the communication network of FIG. 1) in accordance with various aspects described herein. In this figure, each of user device 202 sensors 202A, event capture app 202B, event capture server 208, event capture database 210, external sensors 212, storage format 214, and storage format 216 corresponds to the same element in FIG. 2A. More particularly, this FIG. 2B relates to a request to recreate a past event, a retrieval of pertinent stored event data, and a generation and presentation of image. In operation, a request is submitted by User 1 (via user device 202) to recreate a past event by generating an image that is representative of the past event. In this example, the request is submitted by one of the users (as shown). In another example, the request can be submitted by another party or process. In either case, the request is received by the event capture server 208 (see arrow "A"). The request can be (in one example, which is intended to be illustrative and not restrictive) to "create a picture of us at the game last Friday". The event capture server 208 then processes the request by comparing it to other stored data to determine the pertinent location and therefore potential event data sources to use for the recreation of the event. For example (which is intended to be illustrative and not restrictive), the event capture server 208 can use the request received to determine from user 1's device data the location of the device that is relevant to being at a game last Friday and determine that User 1 was predominantly in a vicinity proximate to X/Y/Z for a period of time.

Still referring to FIG. 2B, the event capture server 208 can (e.g., in connection with retrieval of pertinent stored event data) use the determined location of X/Y/Z and relevant time to query the event capture database 210 for matches for images from other data source(s) that match the time and location (taking into account the location and orientation of the other devices at or about the time of the event). For matching data sources, event data can be returned to the event capture server 208 (see arrow "B"). The event capture server 208 can optionally analyze the received event data and determine likely pertinent data-such as by comparing facial images with other known facial images in User 1's device to include only known people in the eventual generated image.

Still referring to FIG. 2B, the event capture server 208 can (e.g., in connection with generation and presentation of image) compile the retrieved images and process them to remove superfluous content to arrive at pertinent image elements. These image elements can be threaded together to generate a recreation of the event (the time stamps from each individual image element need not precisely match, but rather can be approximate in time). The resulting generated image can be presented to User 1 as shown as output 218 (see arrows "C" and "D").

Figure 2C:
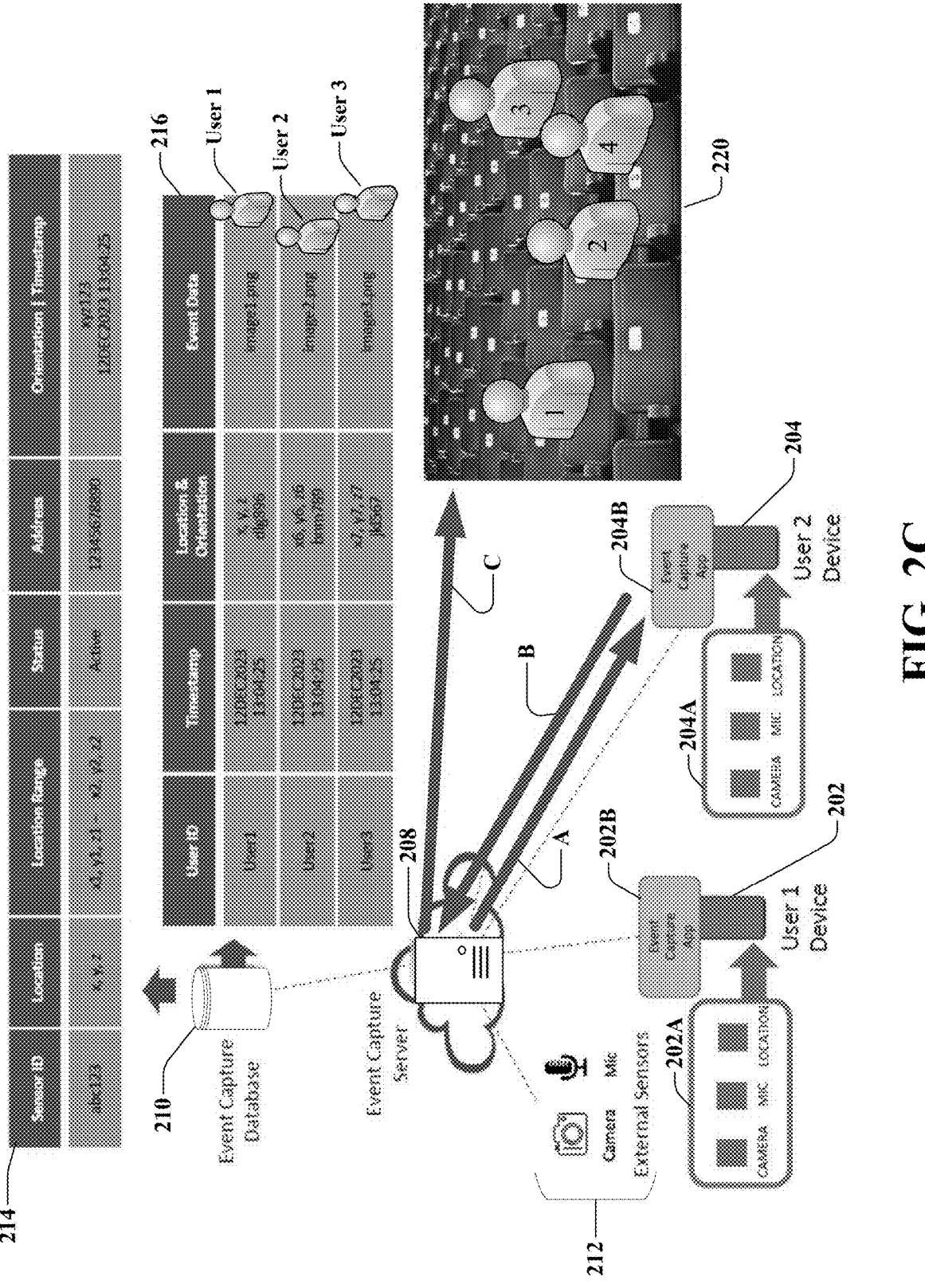
FIG. 2C is a block diagram illustrating an example, non-limiting embodiment of a system (which can function within the communication network of FIG. 1) in accordance with various aspects described herein.

Referring now to FIG. 2C, this is a block diagram illustrating an example, non-limiting embodiment of a system (which can function within the communication network of FIG. 1) in accordance with various aspects described herein. In this figure, each of user device 202, sensors 202A, event capture app 202B, user device 204, sensors 204A, event capture app 204B, event capture server 208, event capture database 210, external sensors 212, storage format 214, and storage format 216 corresponds to the same element in FIG. 2A. More particularly, this FIG. 2C relates to retrieval of pertinent non-stored (that is, not stored at the time of the event) data. In operation, the event capture server 208 can optionally seek additional data that was not previously stored from the event, in order to add additional elements to the resulting generated image. As an example, the event capture server 208 can query other sources for event conditions, such as the weather at the time and location (e.g., if the event was determined to be outside). In another example, the event capture server 208 can query other user(s) known to be at the location of the event based on the time and location match of their event data. A query can be (in one example, which is intended to be illustrative and not restrictive) "Do you remember who was at the game last Friday?" (see arrow "A"). The query can be presented to a user (in this example, User 2), who can respond (see arrow "B") to provide additional non-stored event data. A response can be (in one example, which is intended to be illustrative and not restrictive) "Susan was sitting to my left and she was texting the entire time." The non-stored data provided (by User 2 in this example) can be used by the event capture server 208 to further retrieve other related data that pertains to the event data. For instance, continuing this example, another image of "Susan" can be sent along with the reply (see arrow "C"). The resulting output 220 now includes an image of Susan (labeled as "4"). Alternatively (or additionally), such descriptive non-stored data can be used to retrieve an image element from another source. In yet another example (related to recreation of event from multi-data sources), the source data retrieved can be used to create an image element using AI techniques and insert it into the resulting generated image.

Figure 2D:
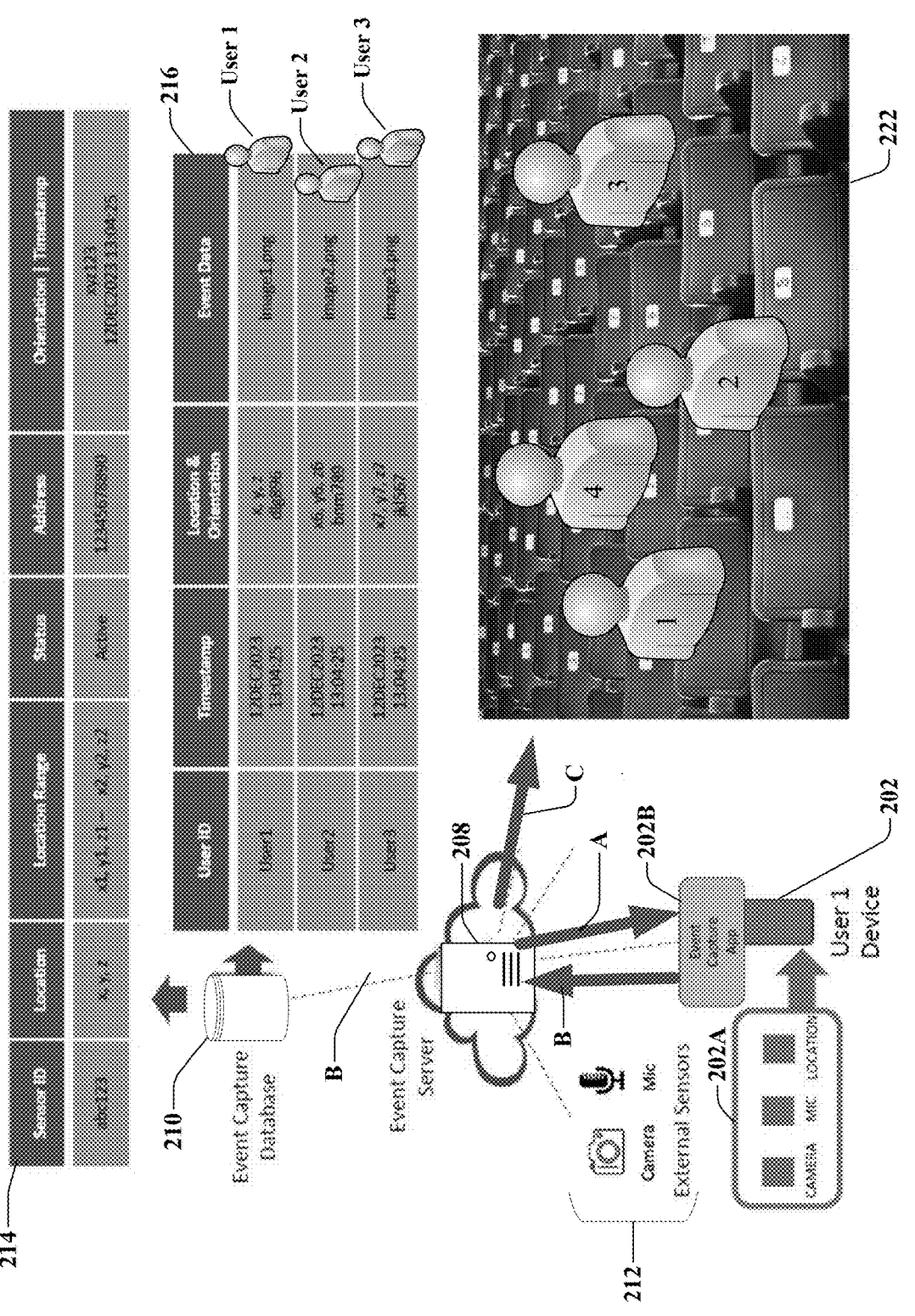
FIG. 2D is a block diagram illustrating an example, non-limiting embodiment of a system (which can function within the communication network of FIG. 1) in accordance with various aspects described herein.

Referring now to FIG. 2D, this is a block diagram illustrating an example, non-limiting embodiment of a system (which can function within the communication network of FIG. 1) in accordance with various aspects described herein. In this figure, each of user device 202, sensors 202A, event capture app 202B, event capture server 208, event capture database 210, external sensors 212, storage format 214, and storage format 216 corresponds to the same element in FIG. 2A. More particularly, this FIG. 2D relates to draft image and user comments. In operation, the generated image can be sent as a "draft" version to one or more of the users, along with a prompt (see arrow "A") to provide additional and/or corrective data (see arrow "B") that the event capture server 208 can use to update the image and provide a revised version of it (see arrow "C" and output 222). In one embodiment, all user comments can be combined and the event capture server 208 can resolve contentious commentary to arrive at decisions of how to revise the image.

In various embodiments, any of the systems described herein can include hardware and/or software (which can include virtual functionality) for providing data storage functions. As an example, a database can be a single database or multiple databases. A database can operate as a user database storing user information including but not limited to user ID data, user location data, and/or sensor-captured data. A database can operate as a user access database storing other user information (e.g., associated with other users). The various data can be managed and collected through the various techniques described herein, including in real-time, near-teal-time, frequently, according to a schedule, and/or according to polling.

In one or more embodiments, one or more of the sensors can be part of IoT device(s). In one or more embodiments, the sensors can be part of equipment associated with a premises, including a WLAN, a home network, a security network, a building management system, and so forth.

In one or more embodiments, locations of users can be determined. For example, techniques or technologies, such as GPS or Wi-Fi triangulation, can accurately identify the proximity of the users to one another.

In one or more embodiments, thresholds can be maintained and/or adjusted (e.g., user-configured) for distance settings and/or time settings for necessary or desired closeness for a group gathering to be considered. In one or more embodiments, the thresholds can be dynamically adjusted based on various factors.

In one or more embodiments, mechanisms can allow for building up a database of various information, which can then be used to recreate an event.

In one or more embodiments, various sensors and devices can be owned, operated or managed by a user and/or by third-parties, including security cameras, public devices such as traffic cameras, door-bell cameras, and so forth.

In one or more embodiments, a method can be executed in whole or in part utilizing applications resident on end user devices, such as mobile apps on a user's mobile phone. In one or more embodiments, Software Development Kits can be made available to facilitate providing the necessary software on end user devices or other computing devices, including home network equipment.

In one or more embodiments, mechanisms can utilize various IoT devices for collecting data associated with users, such as security cameras for capturing images of rooms in a premises, and so forth.

In one or more embodiments, mechanisms can capture various types of data from various sources and synthesize the data to obtain or otherwise generate a recreation of an event.

In one or more embodiments, location detection can be performed in a number of different ways, including monitoring of activity of an end user device of a user (e.g., detecting voice calls being made from the user's mobile phone when the user is located at particular location).

In one or more embodiments, mechanisms can populate or otherwise manage a database utilizing various techniques which can be manually implemented and/or automatically performed. For example, various information associated with the user and other users can be entered by the user and/or other users. Data for users, such as telephone numbers, addresses, etc. can be provided to the database or otherwise retrieved, such as from publicly available information or private sources.

In one or more embodiments, management or maintaining relevant information for the database can be done in a number of different ways which can be automated (e.g., triggered by changes to various subscriber agreements of the user such as where the service provider associated with the subscriber agreement communicates the changes to the database) or manually driven. In one embodiment, a method can monitor communication services (or the initiation thereof) by the user to detect any new or unknown devices, telephone numbers, etc., which can then be provisioned to the database, for example, after being verified by the user as another communication access possibility.

In one or more embodiments, mechanisms can update the user information in the database over time as the user's information changes. In one or more embodiments, mechanisms can apply AI modeling to manage the user information in the database, such as for determining when a particular location of the user is just being visited when travelling or when the particular location is more permanent to the user and requires or otherwise would facilitate operations of the method through collection of physical and/or communication access information or other data.

In one or more embodiments, mechanisms can allow a user to enter initial information associated with themselves and/or with other users (e.g., that are to be considered as part of a group) and, from the initial information (e.g., a friend's name), the mechanisms can further populate the database with known information according to the name or other initial information, such as where the user and the friend subscribe to the same telecommunications service provider. Mechanisms can apply various techniques to implement intelligent provisioning so that the database maintains up-to-date information and is robust. In one or more embodiments, mechanisms can communicate with other systems to collect information for the database, such as public sources (e.g., local tax authority) and/or private sources (e.g., utility company, user's employee, etc.), which can be provided with authorization by the user and/or other users to share certain information that facilitates generation of event recreation.

In one or more embodiments, mechanisms can utilize home networks, security networks, and/or other networks or systems that can have inventories or otherwise have knowledge of devices, sensors and/or other equipment associated with the user or other users (e.g., identity of IoT sensors that communicate with a WLAN of a premises) to populate a database and/or to collect monitoring information (e.g., capturing an image of a room).

In one or more embodiments, mechanisms can utilize, populate and manage a single database that stores user information for all types of users. Although, other embodiments can utilize any number of databases for managing the various user information described herein.

Referring now to FIG. 2E, various steps of a method 2000 according to an embodiment are shown. As seen in this FIG. 2E, step 2002 comprises receiving, by a processing system including a processor, a request to create an electronic representation of a past event, wherein the past event occurred at a first location during a first time period. Next, step 2004 comprises identifying, by the processing system, a plurality of stored data that had been captured by a plurality of sensors, wherein the plurality of stored data comprises first data that had been captured at a second location during a second time period and second data that had been captured at a third location during a third time period, wherein each of the second and third locations is within a threshold distance relative to the first location, and wherein each of the second time period and the third time period is within a threshold time relative to the first time period. Next, step 2006 comprises obtaining, by the processing system, the plurality of stored data that had been identified. Next, step 2008 comprises generating, by the processing system, the electronic representation of the past event, wherein the electronic representation of the past event comprises at least a first element from the first data and at least a second element from the second data.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 2F, various steps of a method 2100 according to an embodiment are shown. As seen in this FIG. 2F, step 2102 comprises receiving an instruction to produce an electronic recreation of a past event, wherein the past event occurred at a venue during a span of time. Next, step 2104 comprises identifying in a database a plurality of stored image files that had been captured by a plurality of cameras, wherein the plurality of stored image files comprises a first image file that had been captured at the venue at a first time that at least partially overlaps the span of time and a second image file that had been captured at the venue at a second time that at least partially overlaps the span of time. Next, step 2106 comprises obtaining, from the database, the first image file and the second image file. Next, step 2108 comprises generating, using at least a first image of a first person who is pictured in the first image file and at least a second image of a second person who is pictured in the second image file, the electronic recreation of the past event.

While for purposes of simplicity of explanation, the respective processes are shown and described as a series of blocks in FIG. 2F, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 2G, various steps of a method 2200 according to an embodiment are shown. As seen in this FIG. 2G, step 2202 comprises receiving, from a first device that is located in a vicinity of a first event, first image capture data, wherein the first event occurred at a first geographic location. Next, step 2204 comprises receiving, from a second device that is located in a vicinity of a second event, second image capture data, wherein the second event occurred at a second geographic location. Next, step 2206 comprises receiving, from a third device that is located in the vicinity of the second event, third image capture data. Next, step 2208 comprises storing each of the first, second, and third image capture data in a database, wherein the first image capture data is stored in the database in association with the first event at the first geographic location, wherein the second image capture data is stored in the database in association with the second event at the second geographic location, and wherein the third image capture data is stored in the database in association with the second event at the second geographic location. Next, step 2210 comprises receiving a request to create an electronic representation of the second event. Next, step 2212 comprises responsive to the request, selecting, as selected image capture data, the second image capture data and the third image capture data, wherein the second and third image capture data are selected based upon being stored in the database in association with the second event at the second geographic location. Next, step 2214 comprises responsive to the selecting, retrieving the selected image capture data from the database. Next, step 2216 comprises generating, based upon the selected image capture data that is retrieved from the database, the electronic representation of the second event, wherein the electronic representation of the second event comprises at least a first portion from the second image capture data and at least a second portion from the third image capture data. Next, step 2218 comprises outputting the electronic representation of the second event that is generated.

While for purposes of simplicity of explanation, the respective processes are shown and described as a series of blocks in FIG. 2G, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As described herein, various embodiments provide a method for generating an electronic representation of a past event, the method comprising: receiving, by a network node, a request to create the electronic representation; determining, by the network node, more than one stored electronic data captured at substantially the same time and location of the event; receiving, by the network node, the more than one stored electronic data; and generating, by the network node, the electronic representation of the past event, wherein the electronic representation includes an element from each of the stored electronic data. In one embodiment, the method further comprises retrieving non-stored data and including the retrieved non-stored data in the generation of the electronic representation. In one embodiment, the method further comprises receiving non-stored revisionary commentary and including the non-stored revisionary commentary in the generation of the revised electronic representation. In one embodiment, electronic representation that is generated is one of: image; audio; video; or any combination thereof.

As described herein, various embodiments provide the capability to present to a user a digital recreation of a past event (even when no such complete digital representation of the past event otherwise exists). In one example, various embodiments provide a mechanism to enable a user to obtain a digital image (and/or video/audio) of a group outing of friends to a baseball game (or the like). In another example, various embodiments provide a mechanism to enable a user to recreate an event such as a crime scene (or other such event of public interest). In other examples, the recreation can be in the form of any desired media (such as a digital image, a video, an audio recreation, or any combination thereof).

As described herein, various embodiments can aggregate portions of video footage taken by each of a plurality of users (e.g., each of a plurality of users at an event). The aggregation can result in a composite image/video. The video footage can be a video stream. The video footage can be uploaded by each user to a server and stored in a database. One or more external sensors can fill in missing gaps.

As described herein, various embodiments can create a composite image/video (e.g., of a past event) without prior knowledge of which users were going to be in attendance.

As described herein, various embodiments can create a composite image/video in the context of a crime scene, a first responder event, or the like.

As described herein, various embodiments can utilize a dedicated event capture app being on each user device (e.g., wherein each event capture app communicates with a server to upload media). In other embodiments, no dedicated event capture app is used, and the users use their devices to instead simply steam and/or upload the media.

As described herein, in various embodiments image/video/audio can be captured by dashcams, traffic light cameras, security cameras, and the like.

As described herein, in various embodiments sensor location, field of view, coverage area and the like can be specified using a geographic coordinate system and/or a 3-dimensional coordinate system.

As described herein, various embodiments can create a composite image/video that is 3-dimensional.

As described herein, various embodiments can create a composite image/video/audio using artificial intelligence.

As described herein, various embodiments can correlate stored images and/or video using facial recognition and the like.

As described herein, various embodiments can create a composite image/video with one or more originally present elements removed.

As described herein, various embodiments can create a composite image/video within defined parameters (e.g. with a radius of 100 feet, or 100 yards).

Figure 3:
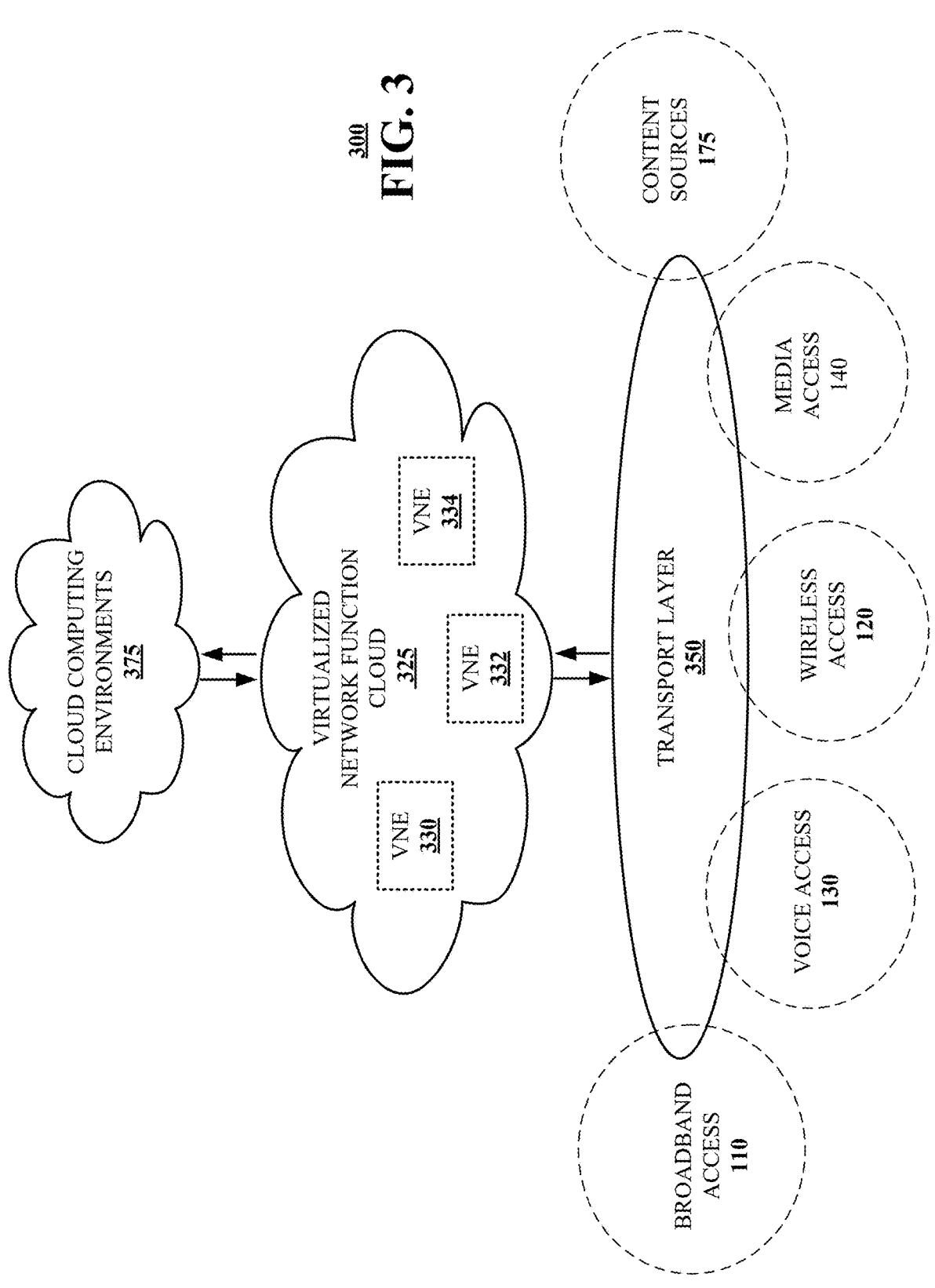
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of the systems shown in FIGS. 1, 2A, 2B, 2C, 2D, and/or some or all of the functions of the methods shown in FIGS. 2E, 2F, 2G.

For example, virtualized communication network 300 can facilitate in whole or in part producing a digital recreation of an event that occurred in the past (the digital recreation can include media such as images, audio, and/or video).

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
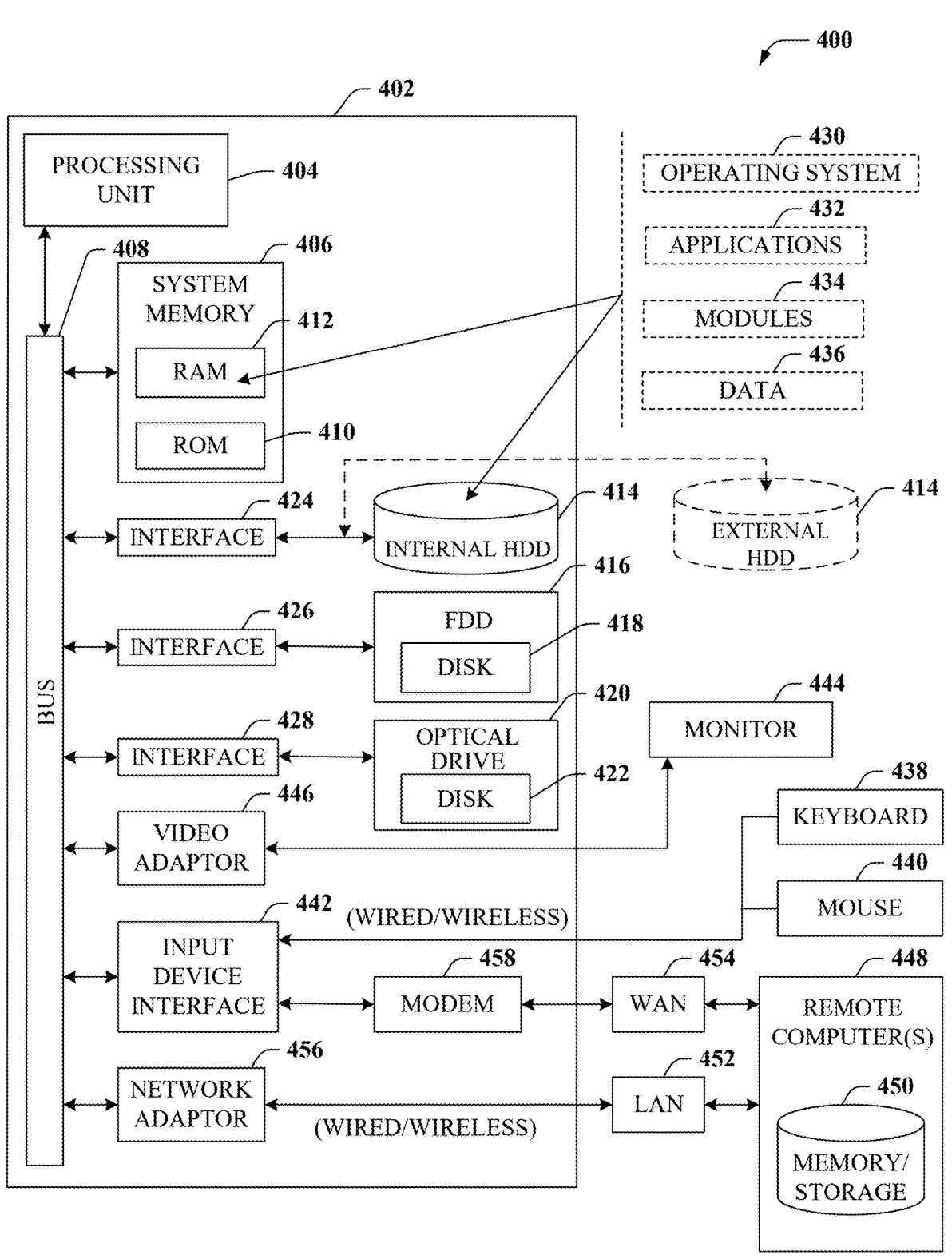
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software.

For example, computing environment 400 can facilitate in whole or in part producing a digital recreation of an event that occurred in the past (the digital recreation can include media such as images, audio, and/or video).

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies.

Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
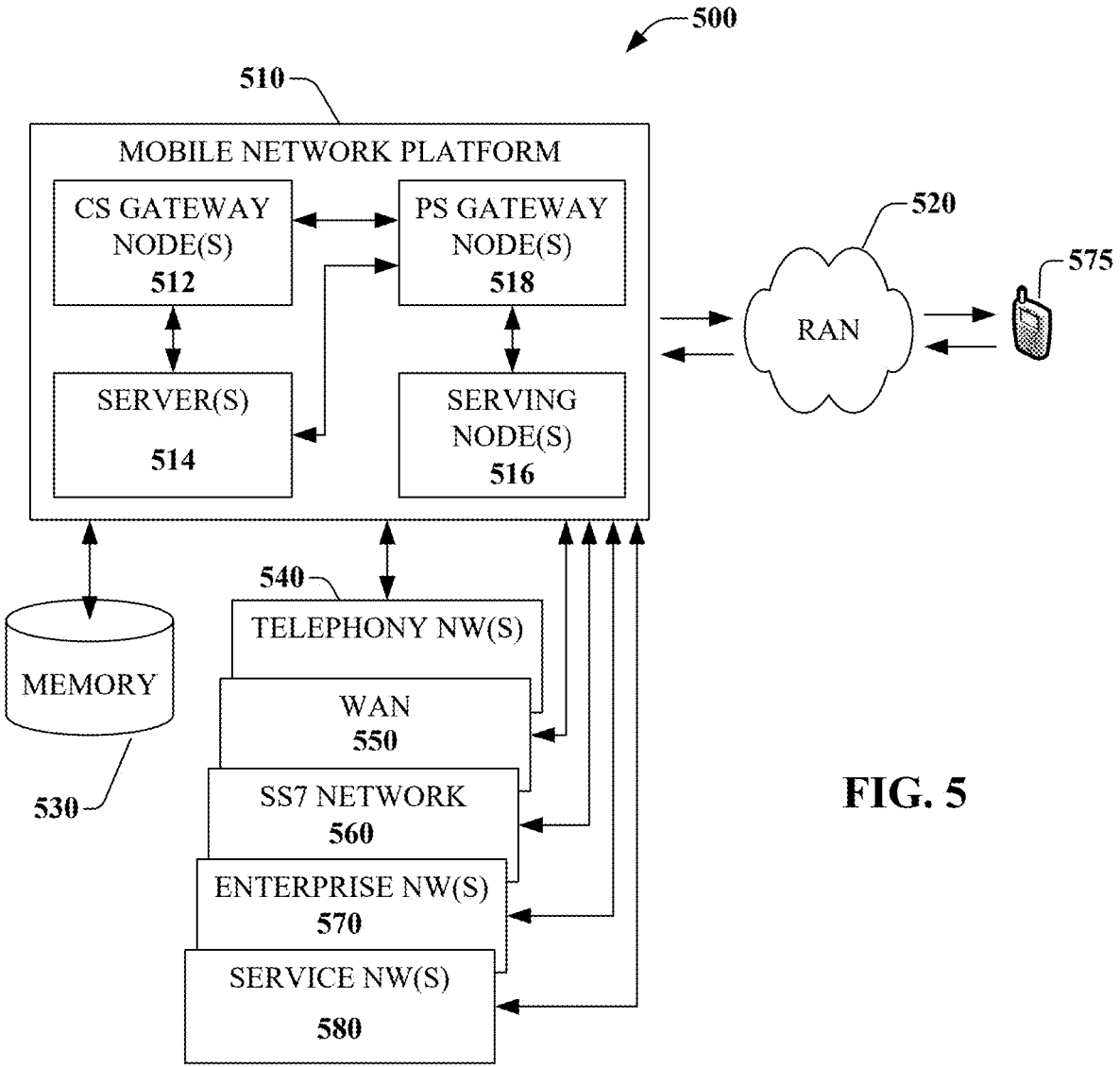
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part producing a digital recreation of an event that occurred in the past (the digital recreation can include media such as images, audio, and/or video).

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
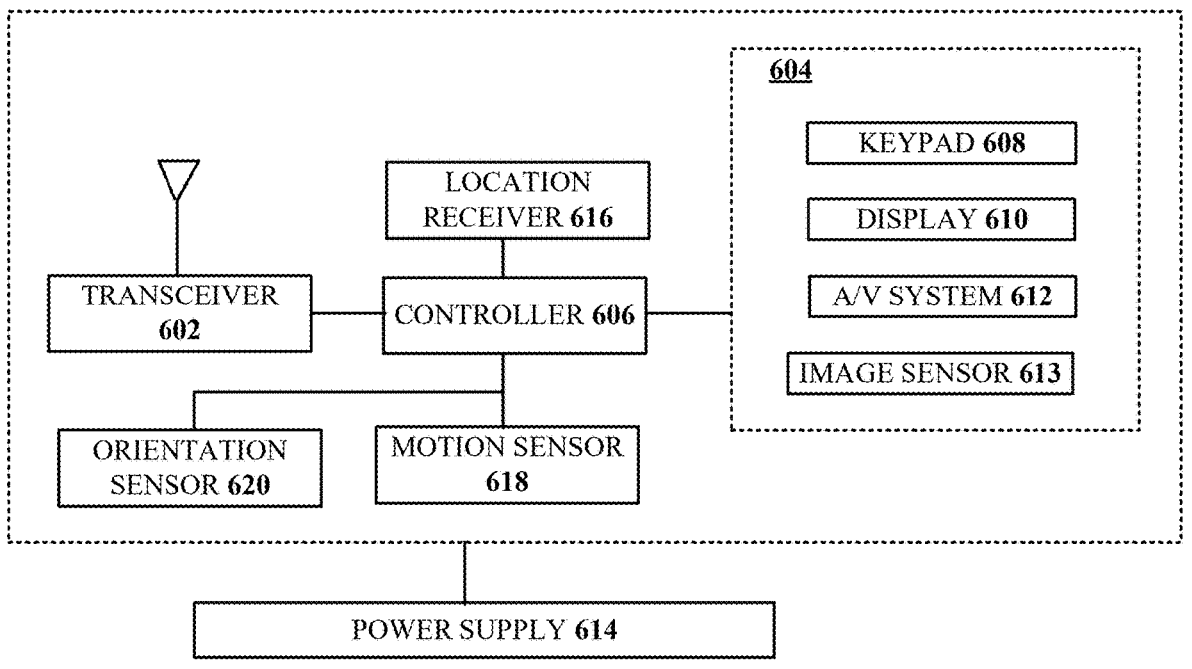
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part producing a digital recreation of an event that occurred in the past (the digital recreation can include media such as images, audio, and/or video).

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human car) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data 2torage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically producing a digital recreation of an event that occurred in the past) can employ various AI-based schemes for carrying out various embodiments thereof. Moreover, a classifier can be employed to determine a ranking or priority of each user, each user device, each event, and/or each media file. A classifier is a function that maps an input attribute vector, $x=(x_1, x_2, x_3, x_4 \ldots x_n)$, to a confidence that the input belongs to a class, that is, $f(x)=confidence$ (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which user(s), user device(s), event(s), and/or media file(s) is to receive priority.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method comprising:

receiving, by a processing system including a processor, a request to create an electronic representation of a past event, wherein the past event occurred at a first location during a first time period;

identifying, by the processing system, a plurality of stored data that had been captured by a plurality of sensors, wherein the plurality of stored data comprises first data that had been captured at a second location during a second time period and second data that had been captured at a third location during a third time period, wherein each of the second and third locations is within a threshold distance relative to the first location, and wherein each of the second time period and the third time period is within a threshold time relative to the first time period;

obtaining, by the processing system, the plurality of stored data that had been identified; and generating, by the processing system, the electronic representation of the past event, wherein the electronic representation of the past event comprises at least a first element from the first data and at least a second element from the second data.

2. The method of claim 1, wherein:

the first data had been captured by a first end-user device of a first user who was in attendance at the past event; and the second data had been captured by a second end-user device of a second user who was in attendance at the past event.

3. The method of claim 2, wherein:

each of the first end-user device and the second end-user device comprises a respective one of: a smartphone; a tablet computer; a laptop computer; a notebook computer; or any combination thereof.

4. The method of claim 2, wherein the request is received from one of: the first user; the second user; or a person who was not in attendance at the past event.

5. The method of claim 1, wherein: one of the first data or the second data had been captured by a sensor mounted at the first location.

6. The method of claim 1, wherein being within the threshold distance relative to the first location comprises one of: partially overlapping the first location; fully overlapping the first location; being within a same building as the first location; being within 100 feet of the first location; or being within 100 yards of the first location.

7. The method of claim 1, wherein the first location comprises one of: a stadium; an auditorium; an arena; a sports venue; a concert venue; a building; an office; a home; an apartment; or any combination thereof.

8. The method of claim 1, wherein being within the threshold time relative to the first time period comprises one of: partially overlapping the first time period; fully overlapping the first time period; being within 1 second of the first time period; being within 10 seconds of the first time period; being within 1 minute of the first time period; or being within 10 minutes of the first time period.

9. The method of claim 1, wherein the obtaining the plurality of stored data that had been identified comprises obtaining from a database.

10. The method of claim 1, wherein:

the first data comprises one of: a first image; first video; first audio; or a first combination thereof;

the second data comprises one of: a second image; second video; second audio; or a second combination thereof; and the electronic representation of the past event comprises one of: a third image; third video; third audio; or a third combination thereof.

11. The method of claim 1, wherein:

the first element from the first data comprises a likeness of one person; and the second element from the second data comprises a likeness of a different person.

12. The method of claim 1, further comprising:

obtaining, by the processing system, other data, wherein the other data is different from the plurality of stored data;

wherein the electronic representation of the past event further comprises at least a third element from the other data.

13. The method of claim 12, wherein the third element comprises one of: an image element; a video element; an audio element; or any combination thereof.

14. The method of claim 13, wherein one of: the other data was captured by a sensor of a device that was not within the threshold distance relative to the first location; the other data was captured by the sensor of the device at another time that was not within the threshold time relative to the first time period; or any combination thereof.

15. The method of claim 1, further comprising:

obtaining, by the processing system, revisionary commentary; and generating, by the processing system, a revised electronic representation of the past event, wherein the revised electronic representation of the past event comprises the revisionary commentary.

16. The method of claim 1, further comprising:

outputting the electronic representation of the past event that is generated;

wherein the outputting comprises one of: outputting a digital image file; outputting a digital video file; outputting a digital audio file; or any combination thereof.

17. A device, comprising:

a processing system including a processor; and a memory that stores executable instructions that, when executed by the processing system, facilitate performance of operations, the operations comprising:

receiving an instruction to produce an electronic recreation of a past event, wherein the past event occurred at a venue during a span of time;

identifying in a database a plurality of stored image files that had been captured by a plurality of cameras, wherein the plurality of stored image files comprises a first image file that had been captured at the venue at a first time that at least partially overlaps the span of time and a second image file that had been captured at the venue at a second time that at least partially overlaps the span of time;

obtaining, from the database, the first image file and the second image file; and generating, using at least a first image of a first person who is pictured in the first image file and at least a second image of a second person who is pictured in the second image file, the electronic recreation of the past event.

18. The device of claim 17, wherein:

the first image file comprises a first still image file: a first video file; or any first combination thereof; and the second image file comprises a second still image file; a second video file; or any second combination thereof.

19. A non-transitory machine-readable medium, comprising executable instructions that, when executed by a processing system including a processor, facilitate performance of operations, the operations comprising:

receiving, from a first device that is located in a vicinity of a first event, first image capture data, wherein the first event occurred at a first geographic location;

receiving, from a second device that is located in a vicinity of a second event, second image capture data, wherein the second event occurred at a second geographic location;

receiving, from a third device that is located in the vicinity of the second event, third image capture data;

storing each of the first, second, and third image capture data in a database, wherein the first image capture data is stored in the database in association with the first event at the first geographic location, wherein the second image capture data is stored in the database in association with the second event at the second geographic location, and wherein the third image capture data is stored in the database in association with the second event at the second geographic location;

receiving a request to create an electronic representation of the second event;

responsive to the request, selecting, as selected image capture data, the second image capture data and the third image capture data, wherein the second and third image capture data are selected based upon being stored in the database in association with the second event at the second geographic location;

responsive to the selecting, retrieving the selected image capture data from the database;

generating, based upon the selected image capture data that is retrieved from the database, the electronic representation of the second event, wherein the electronic representation of the second event comprises at least a first portion from the second image capture data and at least a second portion from the third image capture data; and outputting the electronic representation of the second event that is generated.

20. The non-transitory machine-readable medium of claim 19, wherein the outputting comprises one of: outputting a digital image file: outputting a digital video file; outputting a digital audio file; or any combination thereof.

* * * * *